(No Model.) 2 Sheets—Sheet 1.

C. E. MARTIN.
BICYCLE.

No. 563,292. Patented July 7, 1896.

WITNESSES:

INVENTOR
C. E. Martin
BY
Smith & Benison
ATTORNEYS.

(No Model.) 2 Sheets—Sheet 2.

C. E. MARTIN.
BICYCLE.

No. 563,292. Patented July 7, 1896.

WITNESSES:
Charles. N. Morvin.
Jesse E. Murray.

INVENTOR
C. E. Martin
BY
Smith & Bronson
ATTORNEYS.

UNITED STATES PATENT OFFICE.

CHARLES E. MARTIN, OF PARSONS, PENNSYLVANIA.

BICYCLE.

SPECIFICATION forming part of Letters Patent No. 563,292, dated July 7, 1896.

Application filed November 4, 1895. Serial No. 567,806. (No model.)

*To all whom it may concern:*

Be it known that I, CHARLES E. MARTIN, of Parsons, in the county of Luzerne, in the State of Pennsylvania, have invented new and useful Improvements in Bicycles, of which the following, taken in connection with the accompanying drawings, is a full, clear, and exact description.

This invention relates to improvements in bicycles, and more particularly to means for storing up the power when descending an incline and utilizing it when ascending one.

My object is to produce such an attachment for bicycles so arranged and combined that the rider may easily and readily store up power when going down an incline and be able to easily and readily utilize it when going up one, and to that end my invention consists in the several new and novel features and combinations of parts hereinafter described and which are specifically set forth in the claims hereunto annexed.

It is constructed as follows, reference being had to the accompanying drawings, in which—

Figure 1:
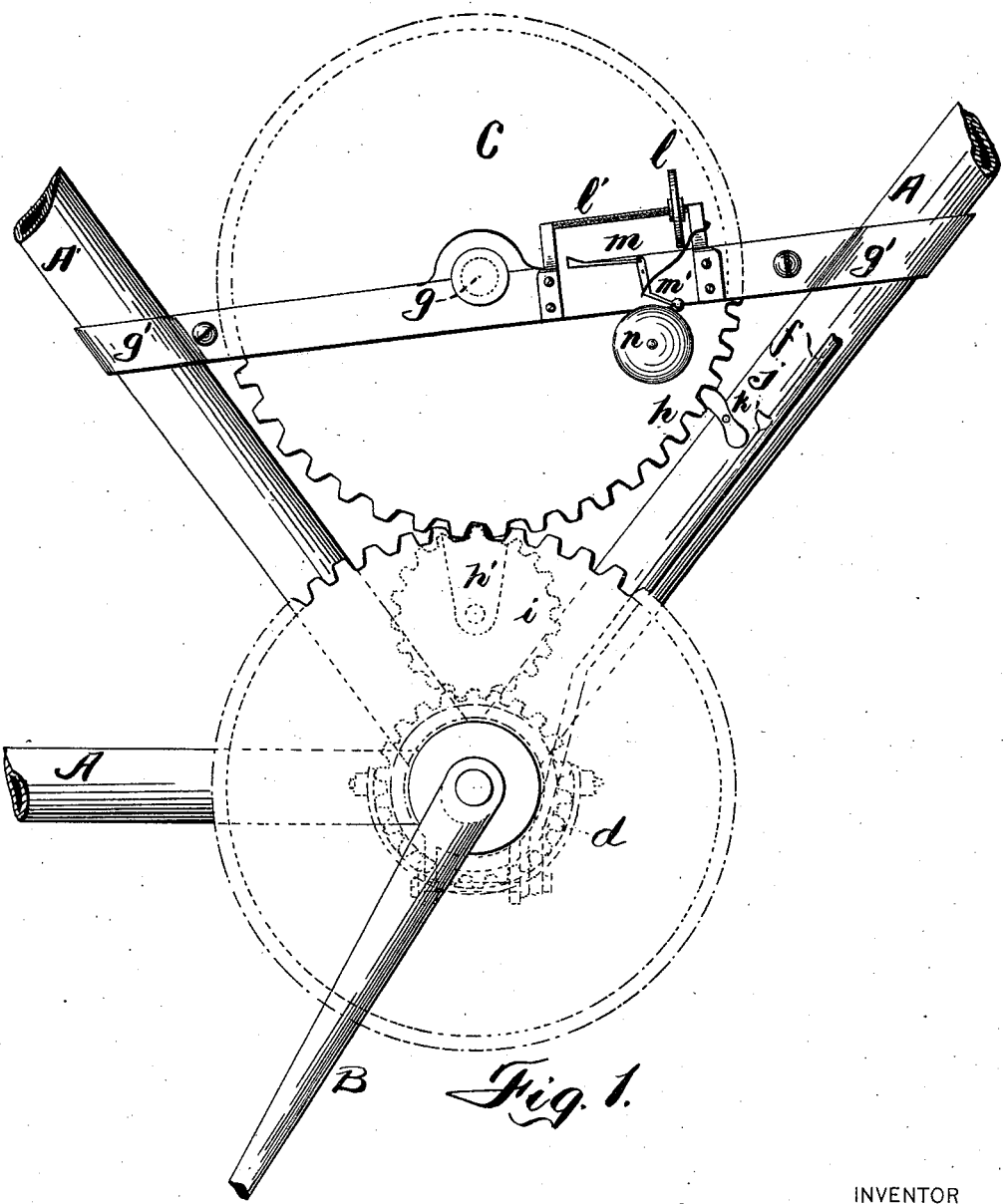
Figure 2:
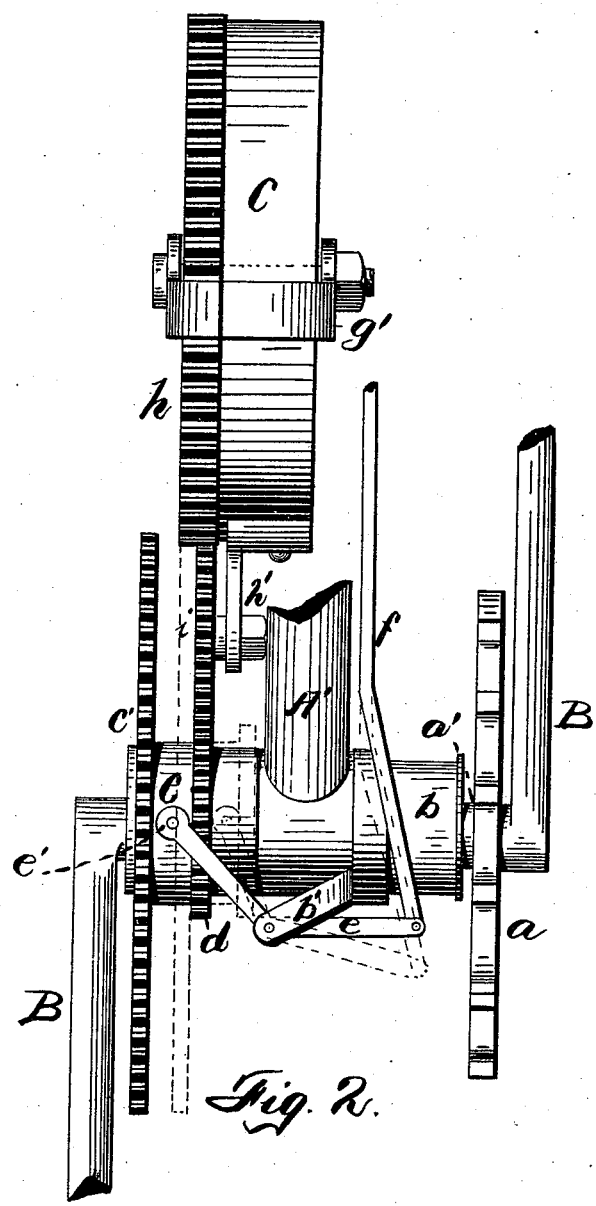

Figure 1 shows a side view of my attachment complete upon a frame of a bicycle, the frame being broken away. Fig. 2 shows an edge view thereof.

Similar letters of reference indicate corresponding parts.

A is the frame of an ordinary bicycle, A' being the cross-piece.

B are the pedal-cranks mounted in the frame, having a sprocket-wheel $a$ secured to the axle $a'$, to which the pedal-cranks are connected. Upon the axle $a'$ is a stationary sleeve $b$, and to this sleeve upon one side of the cross-bar A' of the frame is attached an arm $b'$. Upon the opposite side of the frame is a sleeve $c$, secured to the axle $a'$, adapted to rotate with it by the movement of the pedals. The sleeve $c$ is provided with a large cog-wheel $c'$ and a smaller cog $d$, as shown, and for the purposes hereinafter set forth.

To the arm $b'$ is pivoted an angular lever $e$, having one end secured to a pin $e'$, which is secured to the sleeve $c$, and to its opposite end is connected the rod $f$.

Above the axle and cogs above set forth is mounted a case C upon an axle $g$, which in turn is mounted upon a bracket or cross-bar $g'$.

The case C incloses an ordinary flat coil-spring, (not shown,) and connected with the axle $g$. Upon one side of the case C is a cog-wheel $h$, so arranged and adapted that when it is turned one way it will wind up the spring within the case C and when allowed to rotate the other way will unwind it. To the lower side of the case C is a bracket $h'$, to which is rotatably secured a cog $i$ and adapted to mesh or engage with the cog $h$. When the bicycle is going down an incline and the cog $d$ is allowed to engage with the cog $i$, the cog $i$ in turn meshes with the cog $h$, which serves to wind the spring within the case C until it is wound up. When the rider comes to an incline which he desires to ascend, he forces the rod $f$ down to the position indicated in the dotted lines, thereby throwing the sleeve $c$ inwardly until it occupies the position shown in dotted lines; that is, so as to throw the cog $d$ out of engagement with the cog $i$ and throw the cog $c'$ into engagement with the cog $h$. As the rod $f$ is thrown down the lug $j$ upon said rod throws the pawl $k$ out of engagement with the cog $h$ and the power of the spring exerting itself to rotate the case C and cog $h$ assists in rotating the cog $c'$, which in turn rotates the pedal-cranks, whereby the force which is stored in going down an incline assists in ascending one.

In order to inform the rider when the spring is wound up, a frictional wheel $l$ is mounted upon a threaded rod $l'$, which in turn is mounted upon the cross-piece $g'$. The frictional wheel $l$ is adapted to engage with the face of the case C, and as the case C rotates the wheel $l$ passes along on the thread upon the rod $l'$ until it comes into engagement with the upturned end of the lever $m$, which is mounted upon the cross-bar $g'$ and is provided with a hammer $m'$, adapted to strike the bell $n$. When the rider hears this bell, he then understands that the spring is wound up. He then forces the lever $f$ down part way until he throws the cog $d$ out of engagement with the cog $i$, but not sufficient to allow the cog $c'$ to engage with the cog $h$.

Having described my invention, what I claim, and desire to secure by Letters Patent, is—

1. In a bicycle the combination with a crank-arm and a sleeve secured thereon and having cogs and means for varying its position upon the axle and a motor-spring suitably mounted and provided with a cog, means for throwing the cog secured to the spring and the cog secured to the axle into engagement and an indicating device comprising a frictional wheel suitably mounted engaging with the wheel carrying the spring, and also with the bell-hammer, and said wheel and said bell-hammer, as set forth.

2. The herein-described indicating device comprising a frictional wheel mounted upon a screw-threaded shank said wheel being adapted to engage with the wheel carrying the spring and also with the bell-hammer when the spring is wound up and the wheel, the shank, and bell-hammer in combination, substantially as described for the purposes set forth.

In witness whereof I have hereunto set my hand on this 17th day of October, 1895.

CHARLES E. MARTIN.

In presence of—
ADOLPH J. WEISZ,
J. A. WOOD.